(12) United States Patent
Chapman et al.

(10) Patent No.: US 7,023,550 B2
(45) Date of Patent: Apr. 4, 2006

(54) ALIGNING OPTICAL COMPONENTS OF AN OPTICAL MEASURING SYSTEM

(75) Inventors: Mark Adrian Vincent Chapman, Wotton-under-Edge (GB); David Roberts McMurtry, Stancombe (GB); Benjamin Roller Taylor, Stone (GB)

(73) Assignee: Renishaw PLC, Gloucestershire (GB)

( * ) Notice: Subject to any disclaimer, the term of this patent is extended or adjusted under 35 U.S.C. 154(b) by 225 days.

(21) Appl. No.: 10/483,073

(22) PCT Filed: Jul. 11, 2002

(86) PCT No.: PCT/GB02/03179

§ 371 (c)(1),
(2), (4) Date: Jan. 8, 2004

(87) PCT Pub. No.: WO03/006921

PCT Pub. Date: Jan. 23, 2003

(65) Prior Publication Data

US 2004/0196452 A1 Oct. 7, 2004

(30) Foreign Application Priority Data

Jan. 16, 2002 (GB) ............................... 0200925
Jan. 17, 2002 (GB) ............................... 0201021

(51) Int. Cl.
*G01B 11/00* (2006.01)
(52) U.S. Cl. .................................................... 356/399
(58) Field of Classification Search .. 356/152.1–152.3, 356/153–154, 139.05; 33/502, 533, 613, 33/645
See application file for complete search history.

(56) References Cited

U.S. PATENT DOCUMENTS

| 4,518,855 A | 5/1985 | Malak |
| 4,939,678 A | 7/1990 | Beckwith, Jr. |
| 5,259,120 A * | 11/1993 | Chapman et al. ............ 33/502 |
| 5,507,097 A | 4/1996 | Duey et al. |
| 5,681,981 A * | 10/1997 | McMurtry ................. 73/1.73 |

* cited by examiner

Primary Examiner—Hwa (Andrew) Lee
Assistant Examiner—Isiaka O. Akanbi
(74) Attorney, Agent, or Firm—Oliff & Berridge, PLC

(57) ABSTRACT

Apparatus for aligning an optical measuring system to a desired direction comprises two housings (42,48) attachable to two relatively movable parts of a machine. The housings (42,48) have engagement means (53) such that when they are engaged together the optics inside (44,50) are aligned. The first housing (42) may be provided with attachment means, such as a ball (46), which may be located in a mount (54) on the machine table (56). The position of this ball (46) is determined and the machine spindle housing (48) to be attached to the spindle (60) when the two housings (42,48) are joined and such that the apparatus is aligned with the desired direction. The engagement means (53) between the two housings (42,48) may be compliant along an axis of the apparatus.

17 Claims, 7 Drawing Sheets

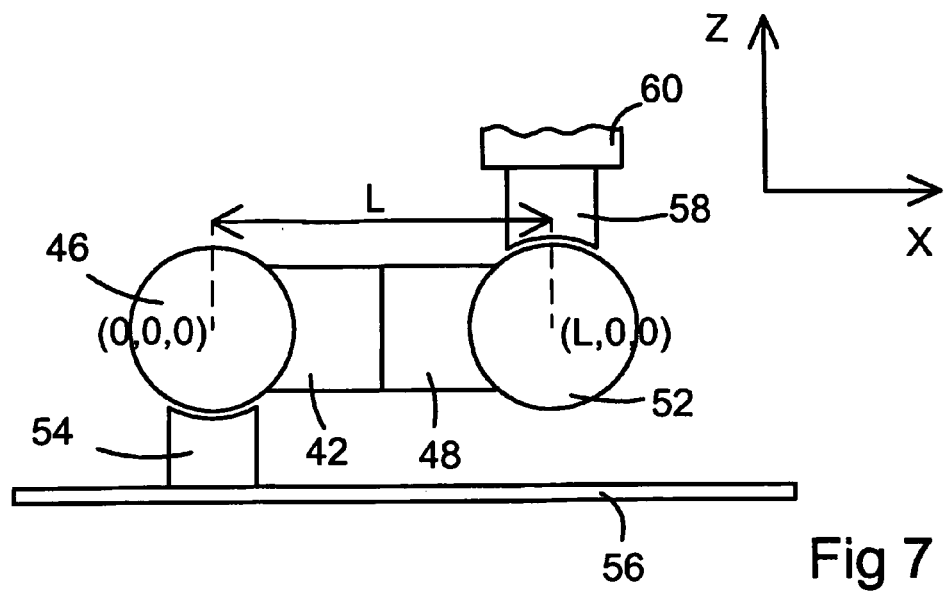
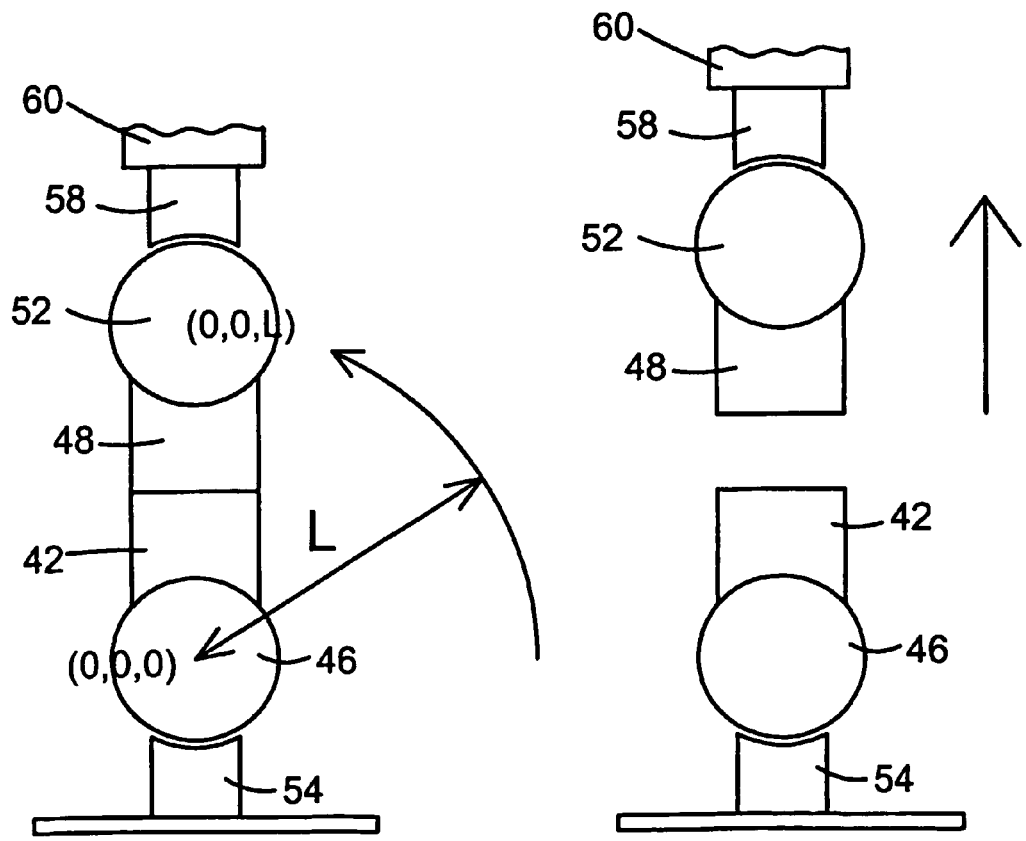
Fig 7
Fig 8
Fig 9

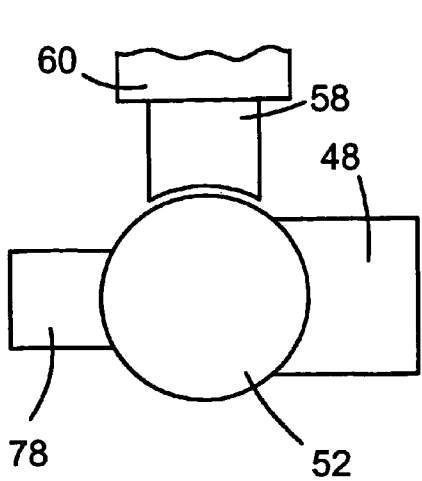
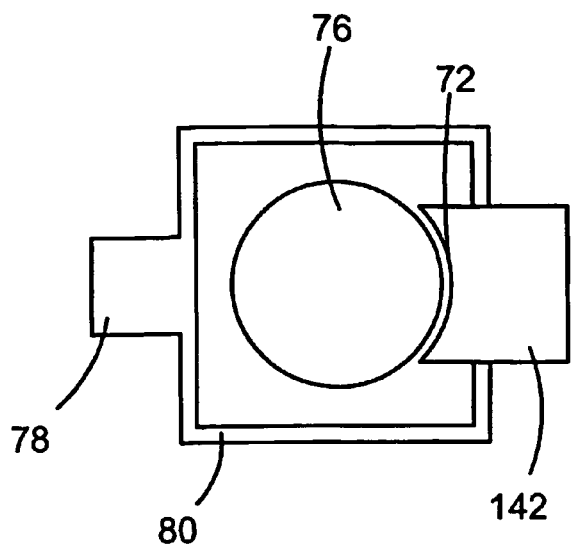
Fig 14   Fig 15
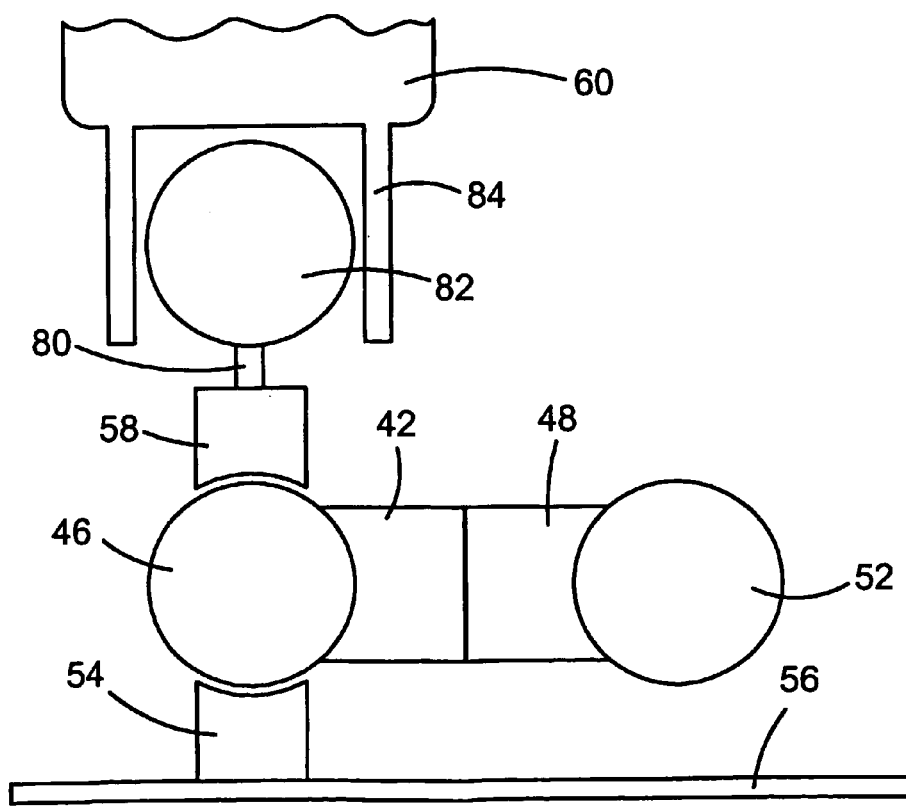
Fig 16

ALIGNING OPTICAL COMPONENTS OF AN OPTICAL MEASURING SYSTEM

The present invention relates to a method of and apparatus for aligning the components of an optical measuring system preparatory to using them in a measuring operation.

One known type of optical measuring system consists of two or more housings, at least one of which is to be fixed to the bed of the machine and another one of which is to be carried by the movable arm or spindle of the machine. One of the housings contains one or more light sources and detectors, and will be referred to hereinafter as the "source housing" while the other housing contains reflectors, and will be referred to hereinafter as the "reflector housing". Usually the source housing is maintained in a fixed position on the bed of the machine and the reflector housing is mounted on a part of the machine moveable with respect to the machine bed e.g. the machine spindle.

Aligning the optical components is often a time-consuming process which involves firstly the alignment of the source housing so that the beam or beams generated are directed along, or parallel to, one or more of the X,Y and Z axes of the machine. Then the reflectors have to be aligned with the beam or beams so that the reflected beams are directed back onto the detectors. Depending on the type of detectors being used the alignment may have to be accurate to within a few arc seconds.

The present invention provides an optical measuring system, for a machine having two relatively movable parts, the measuring system comprising:
  two housings attachable to the two relatively movable parts of the machine;
  wherein each of the housings is provided with a complementary part of an engagement device being such that when the two parts of the engagement device are engaged together, the housings are mutually aligned;
  and wherein at least one housing is rotatable relative to its machine part to enable the optical measuring system to be aligned with a desired direction.

The optical path between the two housings is thus correspondingly aligned with the desired direction.

Preferably the attachment means comprises an at least part-spherical surface on one of the housing and the machine part and a corresponding mating surface on the other of the housing and the machine part. More particularly, the attachment means may comprise an at least part-spherical surface on each of the housings and a corresponding mating surface on both machine parts. The attachment means may comprise an at least part-spherical surface on one housing with a corresponding mating surface on the corresponding machine part and a mating surface on the other housing with an at least part-spherical surface on the corresponding machine part.

Preferably the engagement device provided between the housings is compliant along an axis of the optical measuring system. The engagement device may comprise one or more protruding elements on one housing and one or more corresponding mating features on the other housing, such that the one or more protruding elements may be inserted into the one or more corresponding mating features.

Preferably each housing contains optical components of the optical measuring system, said optical components being pre-set within the respective housings so that when the two parts of the engagement device are engaged together, the optical components in the two housings are mutually correctly aligned.

A second aspect of the present invention comprises a method of aligning optical components of an optical measuring system in a desired direction on a machine having two relatively movable parts, said system comprising two housings containing optical components of the measuring system, each housing being provided with complementary parts of an engagement device arranged so that when said complementary parts are engaged together the housings are mutually aligned, the method comprising the steps, in any order, of:
  engaging together the complementary parts of the engagement device of the two housings;
  mounting the first housing on the first machine part;
  determining the location of the centre of rotation of the first housing when said housing is mounted on the first machine part;
  positioning the second machine part at a distance from the centre of rotation of the first housing to enable the second housing to be mounted on the second machine part when the two housings are connected, and wherein the line between the first and second machine parts is aligned with the desired direction; and
  mounting the second housing on the second machine part.

The invention will now be described, by way of example only, and with reference to the following drawings in which:

FIGS. 7–9 illustrate steps in aligning the ball-bar optical measuring system with a second axis of a machine;

FIG. 14 is a side view of a first embodiment of counterbalancing means on the optical ball-bar;

FIG. 15 is a plan view of a second embodiment of counterbalancing means on the optical ball-bar; and FIG. 16 illustrates a compliant connection between a machine spindle and mounting cup.

Figure 1:
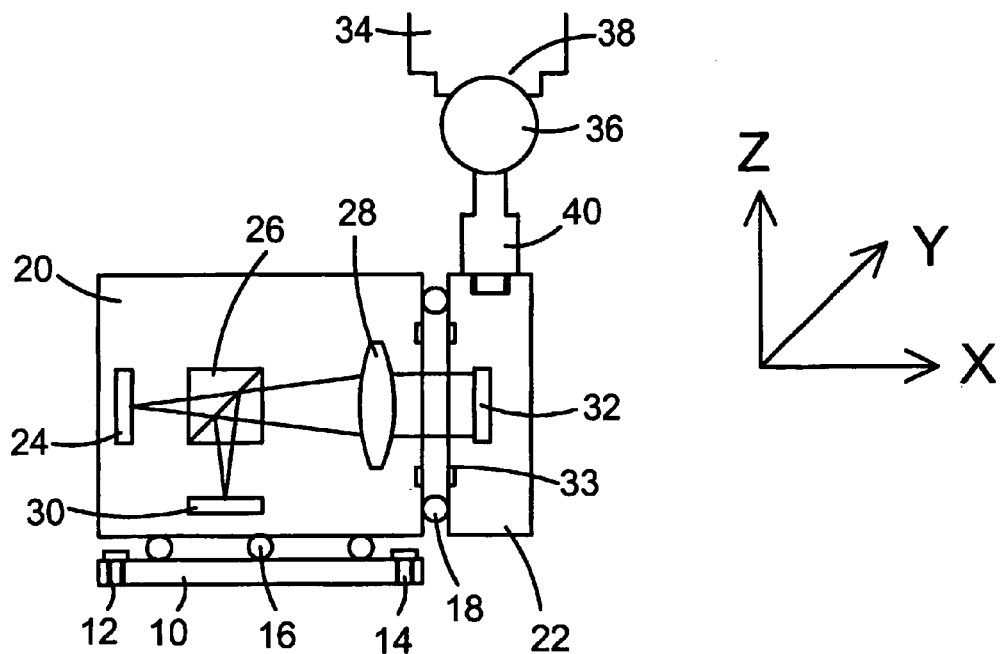
FIG. 1 is a diagrammatic elevation of the component of a prior art optical measuring system.

Referring to the drawings, FIG. 1 shows a prior art embodiment of an optical measuring system for mounting on a machine as disclosed in WO02/04890.

The optical measuring system includes a base plate 10, a source housing 20 and a reflector housing 22, all of which need to be properly aligned with one or more of the machine axes. The base plate 10 is connected to the bed of the machine by screws 12, 14.

The source housing 20 may contain an autocollimator formed in optical sequence by, a light source 24, a beam splitter 26, a collimating lens 28 through which a collimated light beam passes out of the housing, and a detector 30 which receives a return light beam from the reflector 32 in the reflector housing 22 via the beam splitter 26.

The source housing 20 also includes a kinematic seat in the form of three spherical seating elements 16 arranged in a triangular array and spaced at 120° apart. The seating elements 16 co-operate with three V-shaped grooves (not shown) on the base plate 10 to form a conventional kinematic seat for repeatable positioning of the housing on the base plate.

The source housing 20 has a further kinematic seat 18 on its front face (i.e. the face which is orthogonal to the beam direction) on which the reflector housing may be seated. The light source 24 and the reflector 32 are aligned during the manufacturing stage to ensure that when the reflector housing 22 is seated in the kinematic seat 18 on the front face of the source housing 20, the light beam and reflector 32 are properly aligned.

It can be seen therefore that once the source housing 20 is correctly aligned to direct a light beam along one of the machine axes, e.g. the X-axis, the reflector housing 22 can be seated on the kinematic seat 18 on the front face of the source housing 20, and will automatically be aligned with the beam from the light source 24. Magnets 33 are used to urge the two housings 20,22 together at the kinematic seat 18.

In order to take care of any mis-match in position between the machine spindle 34 and the reflector housing 22 when the two are to be connected together, the reflector housing 22 is provided with a limited amount of compliance by using an adjustable connector by means of which the reflector housing 22 can be connected to the spindle 34 of the machine. The adjustable connector has a ball 36 which is to be seated in a socket 38 on the machine spindle 34. The ball 36 is adjustably supported in a retaining device 40 which, in turn is connected to the reflector housing 22, by any suitable means.

Figure 2:
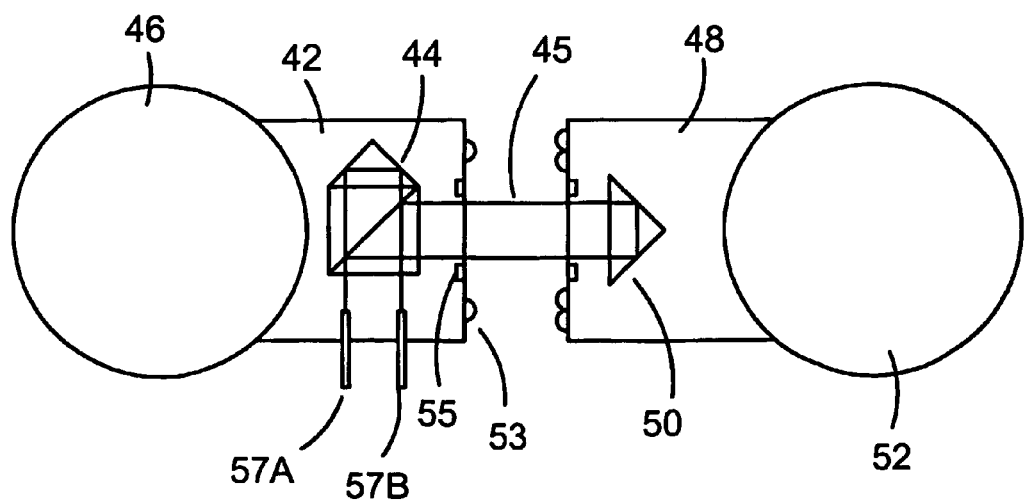
FIG. 2 is a schematic illustration of the ball-bar optical measuring system.

An embodiment of the present invention is illustrated in FIG. 2 in which the two housings form two parts of a ball-bar. The first part comprises a housing 42 which contains the light source and interferometer optics of the linear measurement interferometer 44. A fibre optic delivery system 57A may be used to deliver light to the optics from a remote light source. Fibre optics or wires 57B may deliver light from the optics to a remote detector or deliver a signal from a detector in the housing 42 to an external controller. In an alternative arrangement, the light source may comprise a laser diode inside the housing 42 and a signal from the detector may be transmitted to an external controller by a wireless communication system, for example a radio or optical link. This arrangement has the advantage that the housing 42 could be free from wires or optical fibres. The housing 42 is connected at one end to a ball 46. The second part comprises a housing 48 which contains the retroreflector 50 of the interferometer and is connected at one end to a ball 52. Alternatively the housing 48 may contain a detector for the interferometer.

The two parts of the ball-bar are joined together at a kinematic joint 53 formed by seating elements on each part of the ball-bar which are urged into engagement by magnets 55. The light source and interferometer optics 44 in housing 42 and the retroreflector 50 in housing 48 are arranged such that when the two parts of the ball-bar are joined together they are correctly aligned and the direction of the light beam 45 travelling between the two housings 42,48 is correspondingly aligned with the longitudinal axis of the ball-bar. It is desirable to align the light beam 45 travelling between the two housings with a certain direction, for example a machine axis.

Although it is preferable that the two parts of the ball-bar are aligned in order for the light beam 45 travelling between housings 42,48 to be both square and centred on the optics in the second housing 48, it is only essential that the light beam is square on these optics.

Alignment of the two housings 42,48 for just squareness is much simpler and may easily be achieved by, for example, machining surfaces of the two housings which will be in contact when they are engaged such that abutment of these surfaces causes alignment of the housings. The housings may then be held together by vacuum or other suitable means.

Figure 3:
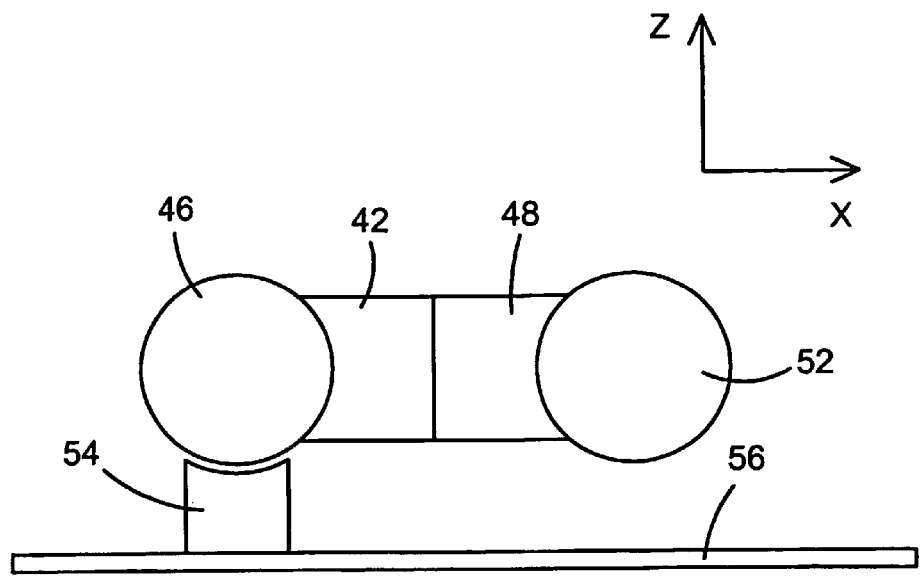
FIGS. 3–6 illustrate steps in aligning the ball-bar optical measuring system with an axis of a machine.

In order to align the ball-bar and light beam 45 along a desired direction for taking measurements, for example machines axes X,Y or Z, a cup 54 is positioned on the machine table 56 as illustrated in FIG. 3. The cup 54 may be retained on the machine table 56 by magnetic means or by any other fixing means. The cup 54 may have three pads (not shown) such that when a ball of the ball-bar is positioned in the cup it is kinematically seated in order to precisely define its position.

Figure 4:
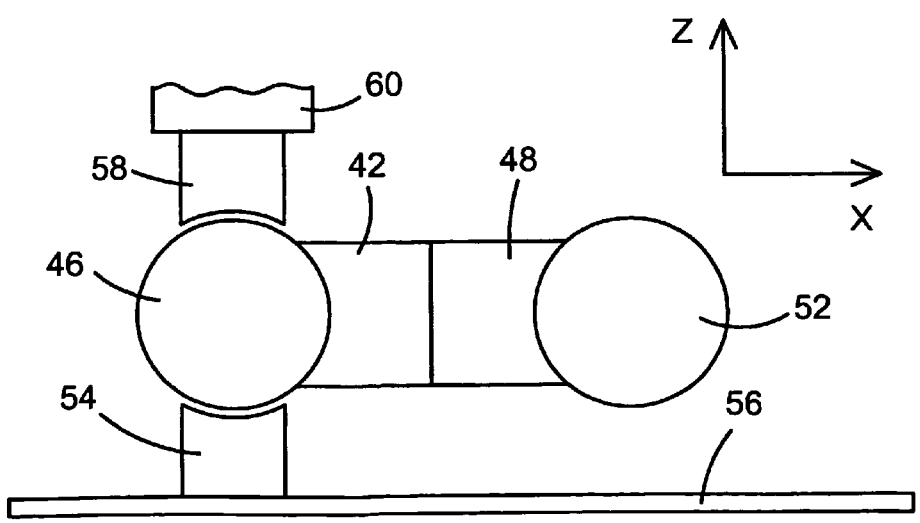

The two parts of the ball-bar are joined together and the ball 46 of the first part of the ball-bar is seated in the cup 54 as shown in FIG. 3. A second cup 58 is mounted in the machine spindle 60 as shown in FIG. 4. Preferably cup 58 also contains three pads on which a ball of the ball-bar may be kinematically seated. The spindle 60 moves the cup 58 into contact with ball 46 of the first part of the ball bar. Once the cup 58 is in contact with the ball 46 its position can be determined from reading of the machine's scales. This position may now be considered the origin (0,0,0). The position of the ball 46 may be determined by alternative means, for example by using a probe.

Figure 5:
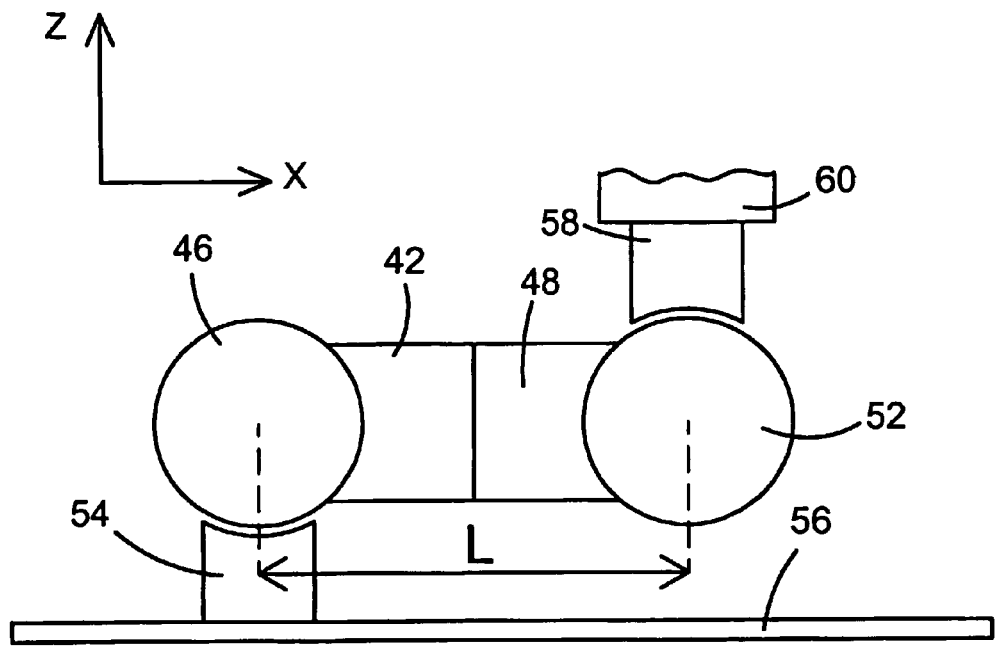

The machine spindle 60 moves to disengage the cup 58 from ball 46 and is moved to a new position a distance L from the origin where L is a distance between the ball centres of the ball-bar. For example spindle 60 may move the cup 58 to a new position a distance L from its initial position along the X-axis as shown in FIG. 5. The ball-bar is then rotated about ball 46 until the ball 52 of the second part of the ball-bar is seated in cup 58. The position of the ball 52 is now (L,0,0).

In order for the spindle 60 to move the cup 58 to the correct position, the balls 46 and 52 are preferably the same size. However, as long as the respective sizes of the balls 46 and 52 (or the difference between them) is known, the machine can compensate for the difference in size.

Figure 6:
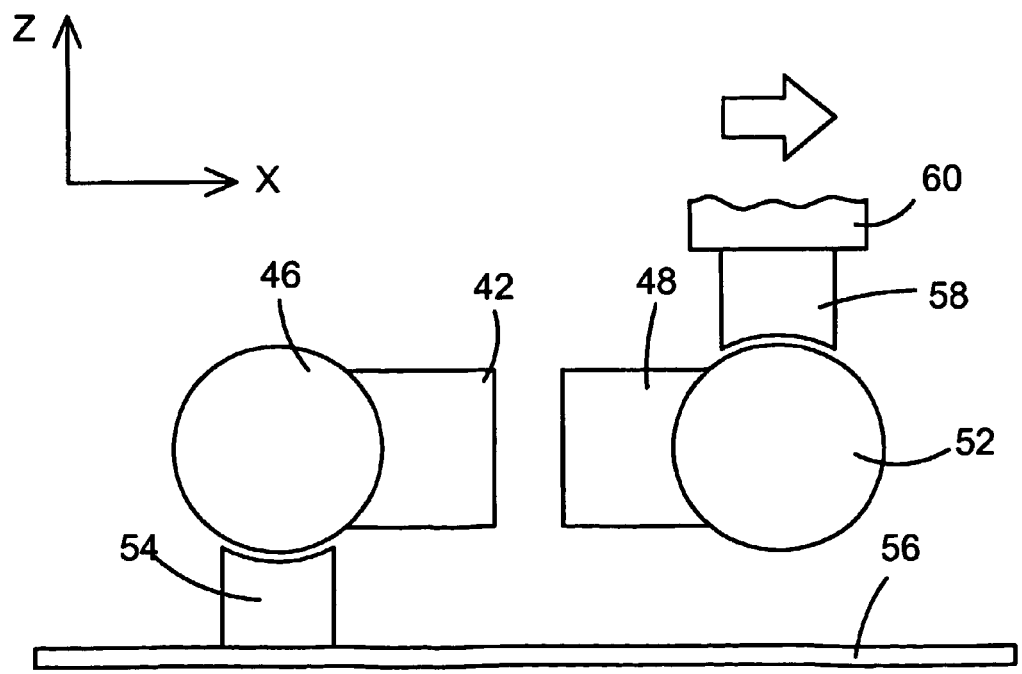

The ball-bar and hence light beam 45 is now aligned along the X-axis. In addition the interferometer optics and the retroreflector are mutually aligned. As shown in FIG. 6 the spindle 60 may now drive cup 58 along the X-axis to break the connection between the two housings 42,48 of the two parts of the ball-bar. The spindle 60 may now move the part of the ball-bar comprising ball 52 and housing 48 along the X-axis to enable measurements to be taken.

This invention thus has the advantage that it enables the ball-bar and the light beam 45 to be aligned in any direction of the machine. Once that direction has been defined the spindle may continue to move in that same direction to take the desired optical measurements.

The cup 58 may be mounted in the machine spindle 60 in a compliant manner. This has the advantage that if the spindle 60 does not move to precisely correct the position to align cup 58 with ball 46, the position of the cup 58 may be adjusted with respect to the spindle. FIG. 16 illustrates the cup 58 mounted in the spindle 60. The cup 58 is attached via a stem 80 to a ball 82. The spindle 60 is provided with a cylindrical bore 84 into which the ball 82 may be inserted. The position of the ball 82 and thus the cup 58 may be adjusted within the cylindrical bore 84. When the cup 58 is in the desired position, a clamp (not shown) is tightened around the cylindrical bore 84 to maintain the cup's position.

To prevent sagging of the ball-bar when the kinematic joint 53 is broken the magnets used to hold the balls in the cups are made sufficiently powerful to hold the housings in their positions. The magnetic force may be reinforced with electromagnets. In addition the weight of the ball-bar may be counterbalanced. FIGS. 14 and 15 illustrate a counterbalance used on the ball-bar. FIG. 14 shows a side view of a part of the ball-bar comprising a housing 48 and ball 52 which is mounted in the cup 58 of the machine spindle 60. A counterbalance weight 78 is attached to the ball 52 on the opposite side to the housing 48. FIG. 15 shows a plan view of a part of a ball-bar comprising a housing 142 including a cup 72 at one end which is mounted on a ball 76 of a mount (not shown). In this case a counterbalance weight 78 is attached to the housing 142 via arms 80 such that when the housing 142 is mounted on the ball 76, the counterbalance weight 78 is on the opposite side of the ball 76 to the housing 142. The shorter the length of the housings, the less forces there are to create sagging.

Alternatively once proper setting between the cups 54, 58 and the balls 46,52 has been achieved, an adjustment mechanism of the cups may be provided which is tightened to hold the balls in position. An example of such an adjustment mechanism is described in International Application WO02/04890.

To reduce the weight of the ball-bar the light source may be a remote light source connected to the ball-bar by a fibre optic cable.

Once the ball-bar has been aligned along a first axis it is very simple to then align it along a second axis as shown in FIGS. 7–9. In FIG. 7 a ball-bar is illustrated with the two parts connected and the ball-bar aligned along the X-axis. The centre of ball 46 is known and is the ball-bar origin (0,0,0). The centre of ball 52 is also known and is a distance L from the centre of ball 46 along the X-axis, i.e. (L,0,0). The spindle may be moved in an arc of radius L about the centre of ball 46 to position the ball-bar along any other direction. For example as shown in FIG. 8, the spindle 60 has rotated the ball-bar about an arc of radius L through 90° until it becomes aligned with the Z-axis and the centre of ball 52 is positioned at (0,0,L). Once the ball-bar is aligned with the Z-axis the spindle 60 may pull the two parts of the ball-bar apart as shown in FIG. 9 to enable measurements to be carried out along this axis.

Figure 12:
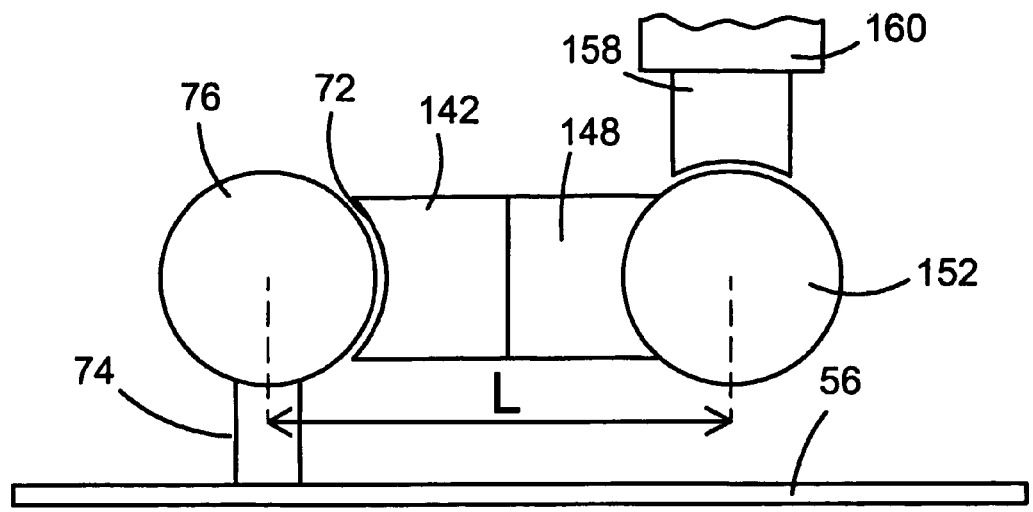
FIG. 12 is a schematic illustration of a second embodiment of the ball-bar optical measuring system.

FIG. 12 illustrates a second embodiment of the present invention in which one part of the ball-bar comprises a housing 142 with a cup 72 at one end whilst the other part of the ball-bar comprises a housing 148 with a ball 152 at one end. In this embodiment the first part of the ball-bar is supported by a mount 74 having a ball 76 which fits into cup 72. The ball 76 is held in the cup 72 by magnetic or other suitable means. A cup 158 is mounted on the machine spindle 160 and the spindle 160 is manoeuvred to position the cup 158 onto ball 76 to determine the ball's position. The spindle 160 then moves the cup 158 in the direction of desired alignment by a distance L from this position. Where L is the distance between the centre of ball 76 of mount 74 and the centre of ball 152 of the ball-bar. The ball-bar is then aligned with this direction as previously described.

The ball could comprise a part-spherical surface of the housing and the cup could comprise any suitable mating surface. The ball and cup may be replaced by any other suitable rotating means, for example a gimbal or universal joint. Preferably this rotating means allows rotation in three dimensions but rotation within a two-dimensional plane (e.g. XY plane) may be sufficient.

Figure 10:
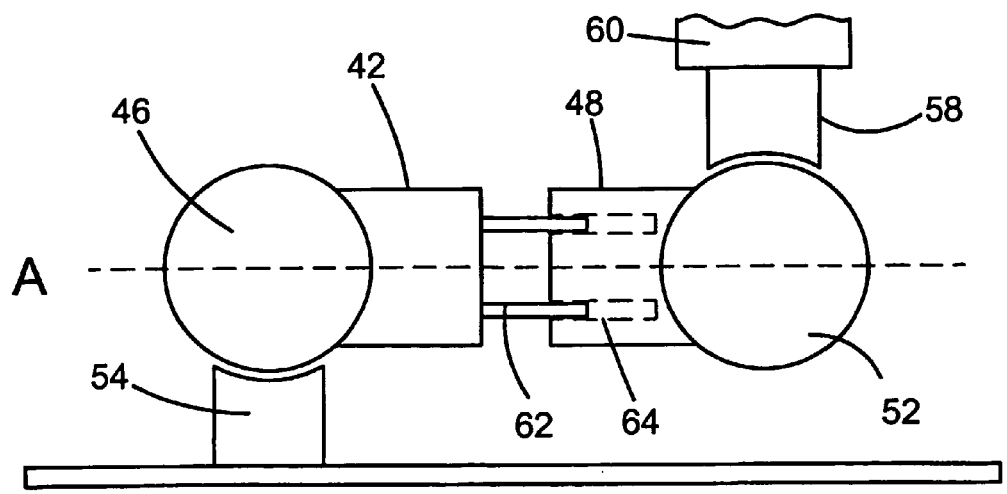
FIG. 10 illustrates a first embodiment of a connection between two parts of the ball-bar optical measuring system.

Alternative connections between the two parts of the ball-bar will now be described in more detail with reference to FIGS. 10 and 11. In FIG. 10, one of the housings 42 is provided with pins 62 aligned with the optical axis A of the system. There may be two pins 62 as shown in FIG. 10, or for example, three pins spaced at 120° about a central axis. Housing 48 is provided with holes 64 corresponding to the pins 62. The two parts of the ball-bar may thus be joined together by inserting the pins 62 into the holes 64. Such an arrangement allows compliance along the longitudinal axis of the ball-bar as the pins slide in and out of the holes, whilst keeping the two parts of the ball-bar accurately aligned in a direction perpendicular to the longitudinal axis of the ball-bar. With this type of connection the accurate alignment perpendicular to the longitudinal axis ensures that the interferometer optics and the retroreflector remain aligned along the longitudinal axis. However movement of the two parts relative to one another along this longitudinal axis does not affect the alignment of the interferometer optics and the retroreflector. Movement in this direction is desirable as it allows some adjustment if the spindle 60 and cup 58 have not moved a distance exactly L from the initial position in which case some compliance may be required.

Figure 11:
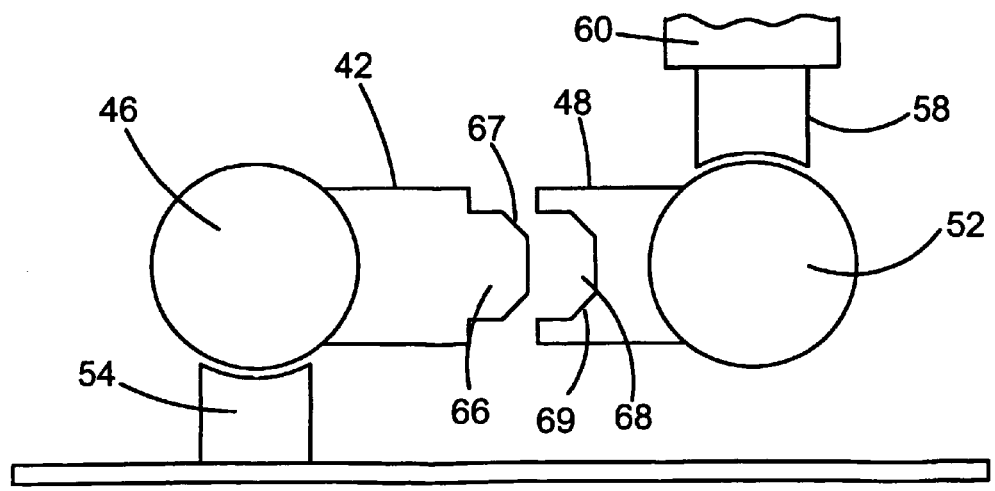
FIG. 11 illustrates a second embodiment of a connection between two parts of the ball-bar optical measuring system.

FIG. 11 shows an alternative arrangement of the kinematic joint between the two parts of the ball-bar. In this embodiment a protrusion 66 on one housing 42 is inserted into a correspondingly shaped aperture 68 on the other housing 48. Tapered surfaces 67,69 on the protrusion 66 and aperture 68 may be provided to ease the location of the protrusion 66 into the aperture 68. The protrusion 66 and aperture 68 may be shaped to allow rotation of one part of the ball-bar with respect to another, if the arrangement of the optics inside the housings 52,58 is such that it is not affected by this rotation. Alternatively features may be provided on the protrusion 66 and aperture 68 to prevent rotation of the two parts with respect to one another.

Any joint connecting the two parts of the ball-bar may be used if it fulfils the criteria that the connection must allow compliance parallel to the longitudinal axis of the ball-bar and that this compliance does not affect the squareness of the optics in the two housings. For example, the connection could comprise a kinematic seat as described above with reference to FIG. 2, in which the elements of the kinematic seat are mounted on a compliant material such as a flexure or spring.

Figure 13:
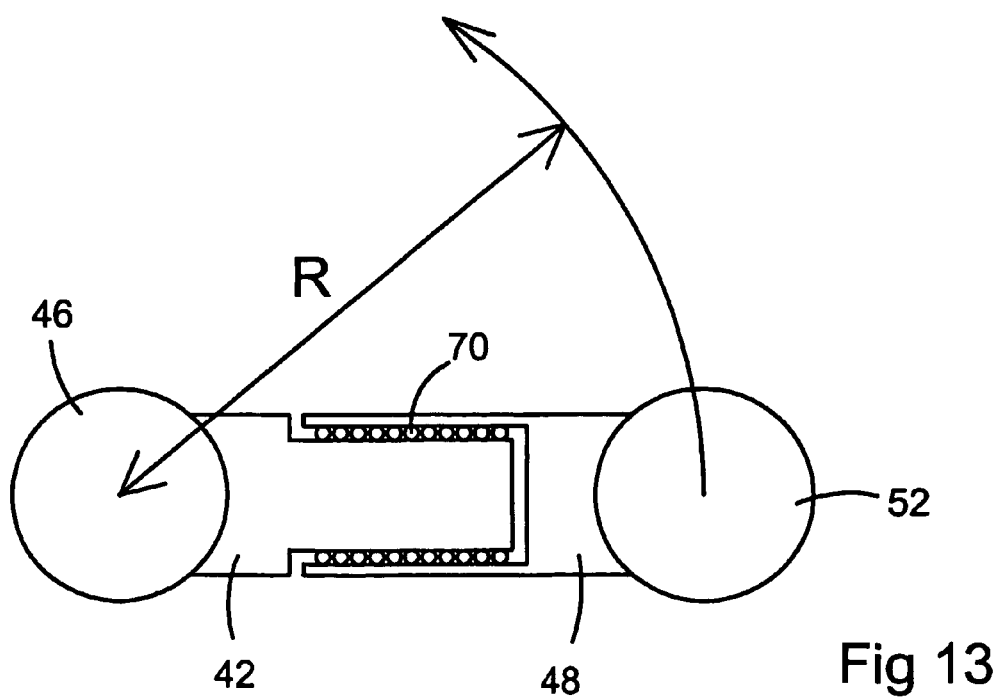
FIG. 13 is a plan view of an optical ball-bar.

The joint between the two parts of the ball-bar may allow further compliance along the longitudinal axis of the ball-bar. Such a joint may comprise a bearing, for example a sleeve bearing. FIG. 13 illustrates such a ball-bar with a sleeve bearing 70 joining the two parts. This apparatus may be used as an optical ball-bar in which the spindle (not shown) drives ball 52 in a circle of radius R around ball 46 mounted in a cup (not shown). The use of a ball-bar to calibrate coordinate positioning machines, such as machine tools and coordinate measuring machines is disclosed in more detail in European Patent No. 0508686. Machine errors cause the path of the spindle to deviate from a true circle and thus causes the distance between the two ball centres to vary as ball 52 is driven round the circle. The joint between the two parts of the ball-bar allows variation in distance between the centres of the two balls 46,52 and the optics inside the ball-bar are used to measure this variation in distance. This information may be used to calibrate the machine errors in a known manner.

What is claimed is:

1. An optical measuring system, for a machine having two relatively movable parts, the measuring system comprising:
    two housings attachable to the two relatively movable parts of the machine;
    wherein each of the housings is provided with a complementary part of an engagement device being such that when the two parts of the engagement device are engaged together, the housings are mutually aligned;

and wherein at least one housing is rotatable relative to its machine part to enable the optical measuring system to be aligned with a desired direction.

2. An optical measuring system according to claim 1 wherein the engagement device enables the two housings to be separated by pulling them apart.

3. An optical measuring system according to claim 1 wherein the at least one housing is rotatable relative to its corresponding machine part in three dimensions.

4. An optical measuring system according to claim 1 wherein the at least one housing is rotatable relative to its corresponding machine part within a two dimensional plane.

5. An optical measuring system according to claim 1 wherein both housings are rotatable relative to their respective machine parts.

6. An optical measuring system according to claim 1 wherein attachment means are provided between at least one housing and its corresponding machine part, said attachment means comprising an at last part spherical surface on one of the housing and the machine part and a corresponding mating surface on the other of the housing and the machine part.

7. An optical measuring system according to claim 6 wherein the attachment means comprise an at least part spherical surface on each of the housings and a corresponding mating surface on both machine parts.

8. An optical measuring system according to claim 6 wherein the attachment means comprise an at least part spherical surface on one housing with a corresponding mating surface on the corresponding machine part and an at least part spherical surface on the other machine part with a corresponding mating surface on the corresponding other housing.

9. An optical measuring system according to claim 1 wherein the optical measuring system has an axis and wherein the engagement device is compliant along this axis.

10. An optical measuring system according to claim 9 wherein the engagement device comprises one or more protruding elements on one housing and one or more corresponding mating features on the other housing, such that the one or more protruding elements may be inserted into the one or more corresponding mating features.

11. An optical measuring system according to claim 10 wherein at least one of the one or more protruding elements and the one or more apertures is provided with a tapered surface.

12. An optical measuring system according to claim 9 wherein the complementary parts of the engagement device are in sliding contact.

13. An optical measuring system according to claim 1 wherein each housing contains optical components of the optical measuring system, said optical components being pre-set within the respective housings so that when the two parts of the engagement device are engaged together, the optical components in the two housings are mutually correctly aligned.

14. An optical measuring system according to claim 1 wherein at least one housing is provided with counterbalancing means.

15. A method of aligning optical components of an optical measuring system in a desired direction on a machine having two relatively movable parts, said system comprising two housings containing optical components of the measuring system, each housing being provided with complementary parts of an engagement device arranged so that when said complementary parts are engaged together the housings are mutually aligned, the method comprising the steps, in any order, of:

engaging together the complementary parts of the engagement device of the two housings;

mounting the first housing on the first machine part;

determining the location of the centre of rotation of the first housing when said housing is mounted on the first machine part;

positioning the second machine part at a distance from the centre of rotation of the first housing to enable the second housing to be mounted on the second machine part when the two housings are connected, and wherein the line between the first and second machine parts is aligned with the desired direction; and mounting the second housing on the second machine part.

16. A method of aligning optical components of an optical measuring system according to claim 15 wherein the first housing is provided with an at least part spherical surface for rotation with respect to the first machine part, the step of determining the location of the centre of rotation of the first housing when said housing is mounted on the first machine part comprising:

mounting in the second machine part a mating surface corresponding to the at least part spherical surface for of the first housing;

bringing the mating surface into contact with the at least part spherical surface of the first housing;

determining the position of the second machine part.

17. A method of aligning optical components of an optical measuring system according to claim 15 wherein the optical measuring system is aligned with a second desired direction, comprising the steps of:

engaging the two housings; and moving the second machine part to rotate the optical measuring system about the centre of rotation of the first housing until it is aligned with the second desired direction.

* * * * *